June 21, 1938.  F. T. FARMER ET AL  2,121,219
LAWN MOWER
Filed May 11, 1936
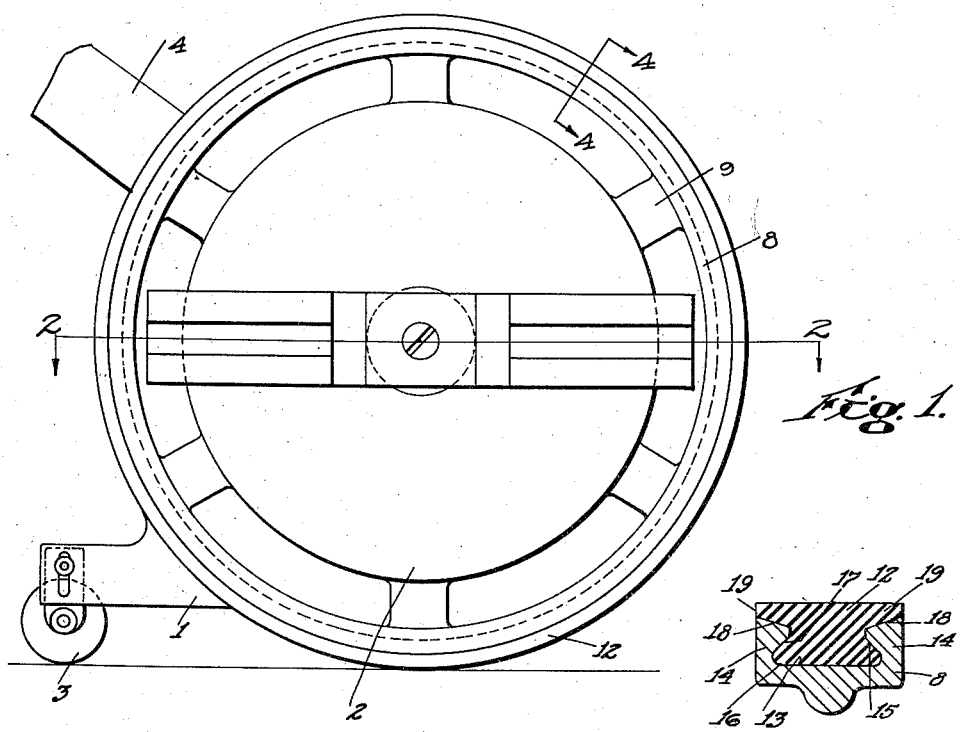
Fig. 1.
Fig. 4.
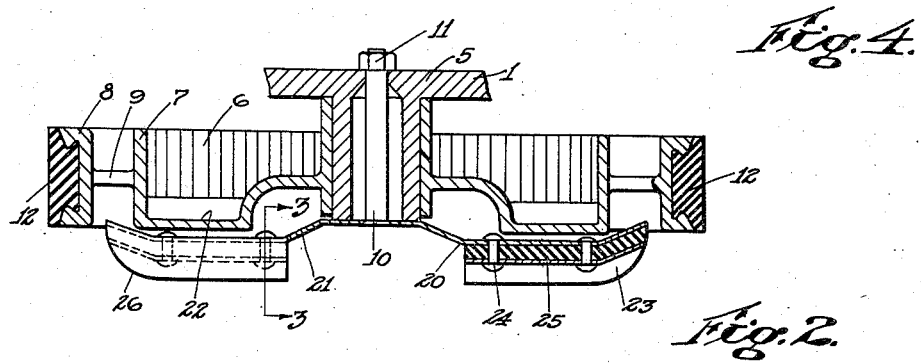
Fig. 2.
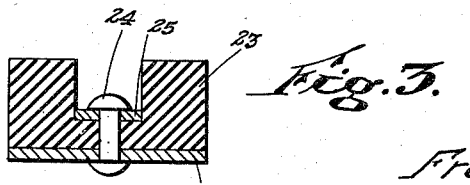
Fig. 3.
Inventors:
Frank T. Farmer
Stanley D. Loud
By Geo. H. Kennedy Jr.
Attorney Patented June 21, 1938

2,121,219

UNITED STATES PATENT OFFICE 2,121,219

LAWN MOWER

Frank T. Farmer and Stanley D. Loud, Worcester, Mass., assignors to Worcester Lawn Mower Company, Worcester, Mass., a corporation of Massachusetts Application May 11, 1936, Serial No. 78,961

3 Claims. (Cl. 56—249)

The present invention relates to lawn mowers and particularly to an arrangement by which injury to objects on the lawn, as a result of coming in contact with the mower wheels, may be avoided.

The use of rubber tires has already been proposed in connection with lawn mowers, as for example, in the Farmer Patent No. 1,896,442, dated Feb. 7, 1933, which suggests the use of rubber tires without, however, indicating any mode of attachment. Rubber tires on other vehicles are also common, but invariably the wheel rim which receives the tire is split in order to make possible the mounting of the tire thereon. One of the objects of the present invention is to provide for the mounting of a rubber tire on a unitary rim, the latter being arranged to hold the tire securely thereon.

In the use of a lawn mower the sides of the wheels frequently come in contact with fences, monuments, trees, or other objects on the lawn and result in damage to the objects by contact between the tree, or other object, and the hard metallic surfaces of the wheels, or even in injury to the mower itself. A further object of the invention is to avoid these objections by the provision of a rubber bumper located on the outside of the wheels of the mower and arranged to protect the wheels from direct engagement with objects on the lawn.

One of the principal features of the invention resides in the provision of a mower so protected as to eliminate entirely the possibility of contact between any part of the wheels and objects on the lawn, thereby avoiding any possibility of damage to the objects or mower, and also reducing the noise of the mower in operation. This complete protection of the mower wheels involves the provision of rubber tires on the mower wheels in combination with the bumper on the sides thereof, which prevent the wheels from engaging with any object on the lawn, either with the metallic rim of the wheel or the side thereof.

Other and further objects and advantages of the invention will appear from the following detailed description taken in connection with the accompanying drawing in which—

Fig. 1 is a side elevation of a lawn mower embodying the invention.

Fig. 2 is a horizontal sectional view through one wheel of the mower, as for example, along the line 2—2 of Fig. 1.

Fig. 3 is a sectional view along the line 3—3 of Fig. 2, and

Fig. 4 is a sectional view on a larger scale along the line 4—4 of Fig. 1, showing the attachment of the rubber tire to the mower wheel.

Like reference characters refer to like parts in the different figures.

Referring first to Fig. 1, the mower has the usual frame 1 on which are mounted at opposite ends thereof the wheels 2, only one of which is shown. The frame is also supported by the usual roller 3 in back of the large wheels 2, and is propelled by a handle 4 suitably attached to the frame in any desired manner. The usual cutter bar and rotary blades, not shown, are also provided, as in the usual arrangement, but as these are not a part of the invention they will not be described.

Referring now to Fig. 2, the frame 1 has, at each end thereof, an integral projecting spindle or sleeve 5, which is horizontally positioned, and on which the wheel 2 is journalled, the latter having the usual ring gear 6 on a cylindrical flange 7 for driving the rotary cutting blades. The rim 8 of the wheel is connected to the flange 7 as by spokes 9, and the wheel is held on the sleeve by a bolt 10 passing through the sleeve and having a nut 11 engaging with the inner side of the frame member.

According to the present invention the rim 8 of the wheel has a rubber tire 12 secured thereto, and to this end the rim has a flat outer surface 13 positioned between opposed radial flanges 14 adjacent opposite side edges of the rim. The flanges define therebetween a recess 15, in which the dovetail-shaped bead 16 of the tire is located. The inner surfaces 17 of the flanges 14 converge in a direction away from the surface 13, so that the recess 15 is dovetail-shaped in cross section, to correspond to the shape of the tire bead. The outer peripheral surfaces 18 of the flanges 14 slant inwardly toward each other and form a support for the outwardly extending flanges 19 of the tire. The latter is substantially equal in width to the width of the wheel rim, so that the entire rim, including the flanges 14, is entirely protected by rubber, making it impossible for any part of the rim of the wheel to come in contact with objects on the lawn.

The tire is mounted by stretching it over either of the flanges 14, since in stretching it the dovetail-shaped bead of the tire is made sufficiently narrow to enter the dovetail-shaped recess provided between the two flanges. This type of mounting permits the wheel to be one entire unit, without the necessity for any removable plate to aid in clamping the tire, and also provides a secure mounting for the tire when the latter is in place.

Associated with the rubber tire, and forming a more complete protection of the wheel, is a bumper 20, which is held in position by the same bolt 10 that holds the wheel 2 on the sleeve 5. The bumper is held against the end of the sleeve 5 and against turning movement by tightening the bolt 10, thus clamping the bumper tightly against the end of the sleeve, but not interfering with rotation of the wheel 2, whose hub is slightly shorter than the sleeve. The bumper 20 consists of a resilient metallic plate 21, long enough to extend across the face of the wheel 2 from a point adjacent to the rim 8 at one side of the wheel, to a similar point at the opposite side. The wheel, in the construction shown, is dished, as at 22, and the ends of the plate 21 are accordingly bent inwardly, as shown, to a point close to, but separate from the spokes of the wheel. At each side of the central portion of the plate 21 is mounted a rubber member 23, which, as best shown in Fig. 3, is U-shaped in cross section. The member 23 is held in position by rivets 24 extending through a metallic strip 25 positioned in the base of the U, and through the plate 21. Each member 23 extends from the end of the plate 21 to a point adjacent the center thereof, and since the plate is horizontally positioned, the members form a bumper which prevents the outer surface of the wheel from engaging with any objects on the lawn. The plate 21, being somewhat resilient, also absorbs the shock as the bumper comes in contact with any objects on the lawn, but the resiliency is such that the plate will not be sprung enough to hit the wheel.

The strip 25 as well as the plate 21 is entirely protected by the rubber members 23 so that no metallic part of the bumper or mower wheel will engage with objects on the lawn. The ends of the rubber members 23 are arcuate, as at 26, so that as they engage with objects on the lawn the mower will slide past the objects without catching thereon, the outer end of the arcuate surface being substantially in the plane of the outer surface of the wheel rim. The wheel rim and rubber tread are wide enough so that the outer ends of the plate 21 are positioned inside of the outer edge of the wheel rim. The ends of the plate are thus protected fully from contact with any objects on the lawn.

From the foregoing it will be apparent that a full protection for the wheels of the lawn mower is provided for preventing the wheel from directly engaging objects on the lawn, thereby avoiding damage to the objects, as well as a possibility of injury to the wheel. This complete protection comprises the peripherally positioned rubber tire 12, as well as the bumper 20, which fully protects the outside of the wheel. The bumper is readily attached to the mower on the outside of the wheels, and remains in the horizontal position shown.

We claim:

1. In a lawn mower having a frame providing a spindle on which a wheel for the mower is journalled, a bumper secured to said spindle on the outside of the wheel to protect the wheel from engagement with other objects, said bumper being supported only by said spindle and comprising a horizontally extending bar having rubber elements on the outer side thereof to avoid contact between the mower and objects on the lawn, said bar extending over substantially the entire diameter of the wheel.

2. In a lawn mower, the combination with a mower wheel having a resilient tread, of a resilient bumper extending across the outerside of the wheel, said bumper being in the form of a horizontally extending bar held against rotation on the mower on the outer side of the wheel, said bar having rubber elements thereon and being of a length substantially equal to the diameter of the wheel and extending across substantially the entire outer side of the wheel, said bumper forming with the resilient tread a complete protection to prevent engagement between the mower wheel and other objects.

3. In a lawn mower, the combination with a mower wheel having a resilient tread extending the entire width of the wheel rim, of a resilient bumper extending across substantially the entire diameter of the outside of the wheel, and being mounted on the mower independently of the wheel, said bumper being in the form of a horizontally extending bar substantially equal in length to the diameter of the wheel and having rubber elements on the outer side thereof.

FRANK T. FARMER.
STANLEY D. LOUD.